Aug. 21, 1956

F. X. BONNEAU 2,759,540

SHEAR

Filed Jan. 13, 1954

3 Sheets-Sheet 1

INVENTOR.
Frank X. Bonneau
BY
Norman S. Blodgett
Attorney

Aug. 21, 1956 F. X. BONNEAU 2,759,540
SHEAR

Filed Jan. 13, 1954 3 Sheets-Sheet 2

INVENTOR.
Frank X. Bonneau
BY Norman S. Blodgett
Attorney

Aug. 21, 1956 F. X. BONNEAU 2,759,540
SHEAR
Filed Jan. 13, 1954 3 Sheets-Sheet 3
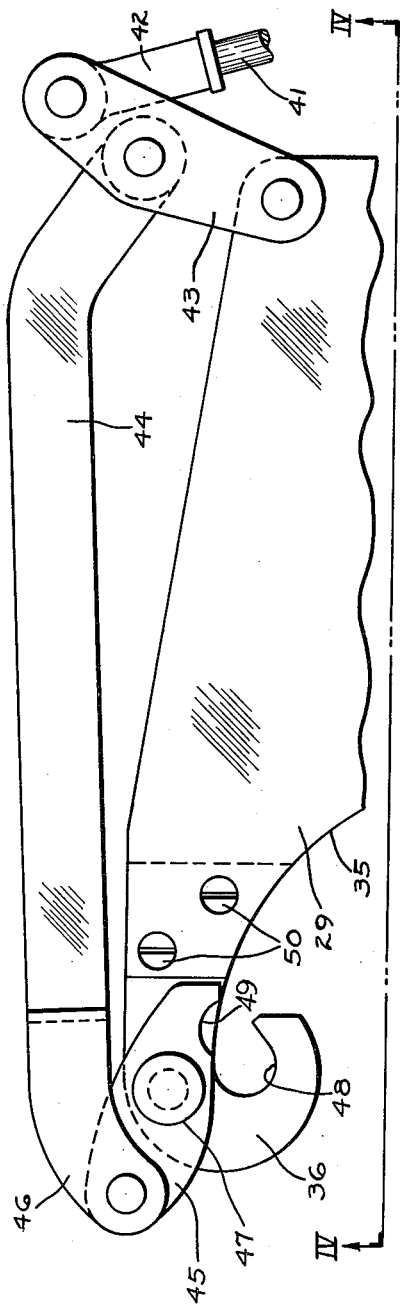
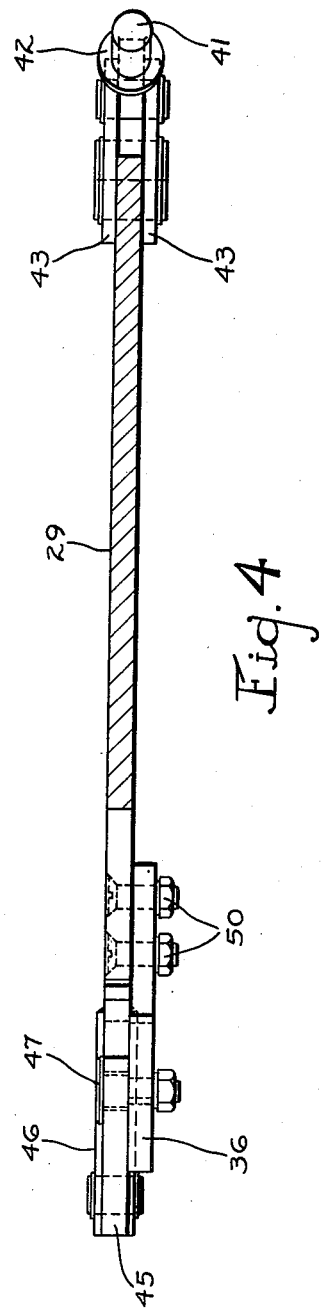
INVENTOR.
Frank X. Bonneau
BY
Norman S. Blodgett
Attorney

United States Patent Office 2,759,540
Patented Aug. 21, 1956

2,759,540
SHEAR

Frank X. Bonneau, Worcester, Mass., assignor to Machinery Electrification Inc., Worcester, Mass., a corporation of Massachusetts Application January 13, 1954, Serial No. 403,676

3 Claims. (Cl. 164—41)

This invention relates to shears and more particularly to an apparatus for severing wire that is moving transversely of its length.

In the fabrication of insulated wire and the like it is customary to coil accurate lengths of the finished product for ease in handling. In order to do this machines have been developed having two coiling drums, one drum always receiving the wire. The other drum is, thus, in such a condition that the operator may remove a finished coil of wire therefrom. A traversing mechanism selects the drum on which the wire will be coiled and carries the wire from one drum to the other when the one drum is filled. In traversing from one drum to another, however, a strand of wire remains connecting the two drums. In the past a large knife has been thrown into the space between the drums by means of a solenoid and the wire strikes the knife, whereupon the wire is severed. Many difficulties have been experienced with the use of this means of cutting the wire between coils. For one thing, the cutting is a matter of accident, so the time within which it takes place is not definite. The cutting is by impact and the severed ends are, therefore, ragged or frayed. These and other difficulties of the prior art are obviated by the present invention.

It is, therefore, an outstanding object of the invention to provide a shear for cutting wire which is moving at random transversely of its length.

Another object of this invention is the provision of an apparatus for use with a two-drum coiler for severing wire extending therebetween.

It is a still further object of the present invention to provide a shear for cutting elongated material in an unsupported portion thereof.

Another object of the invention is the provision of an apparatus for severing an elongated article in a portion thereof in which one end is moved in a circle while the other end moves in a similar circle in a different phase thereof.

It is also an object of the invention to provide a shearing means for transversely moving wire, wherein the wire is guided to a fixed cutting position and firmly held during shearing.

Figure 1:
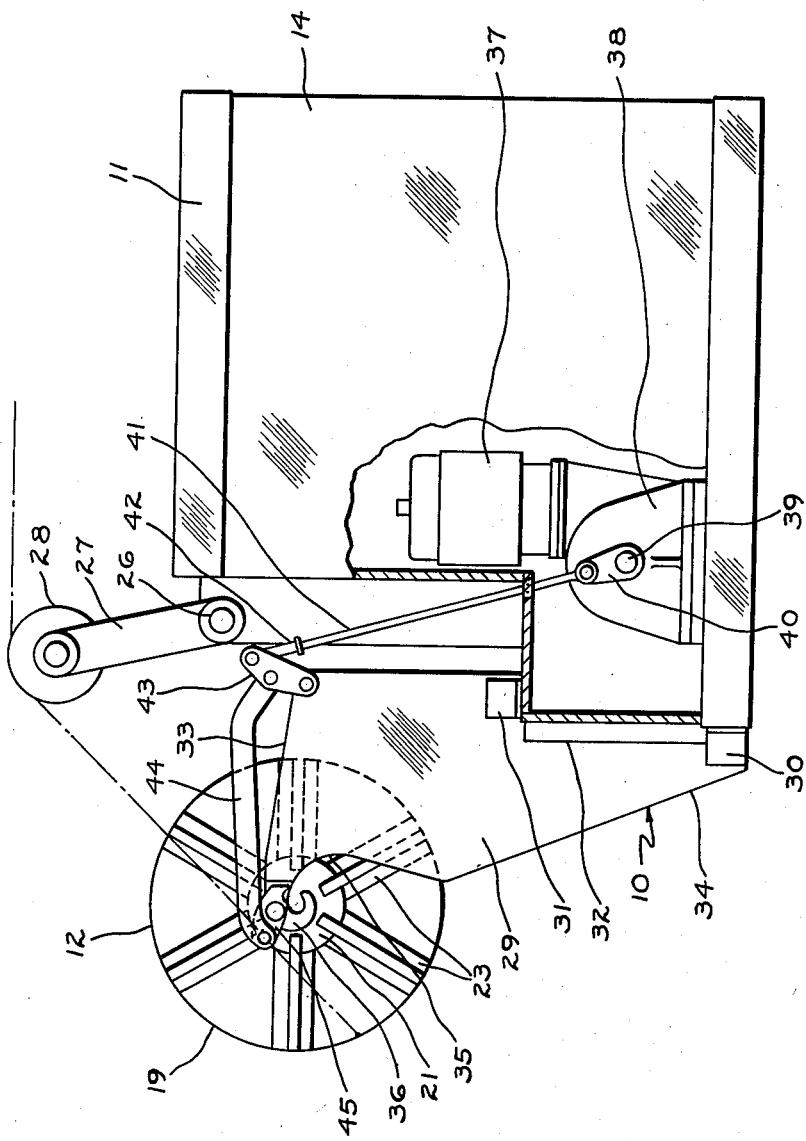
Figure 2:
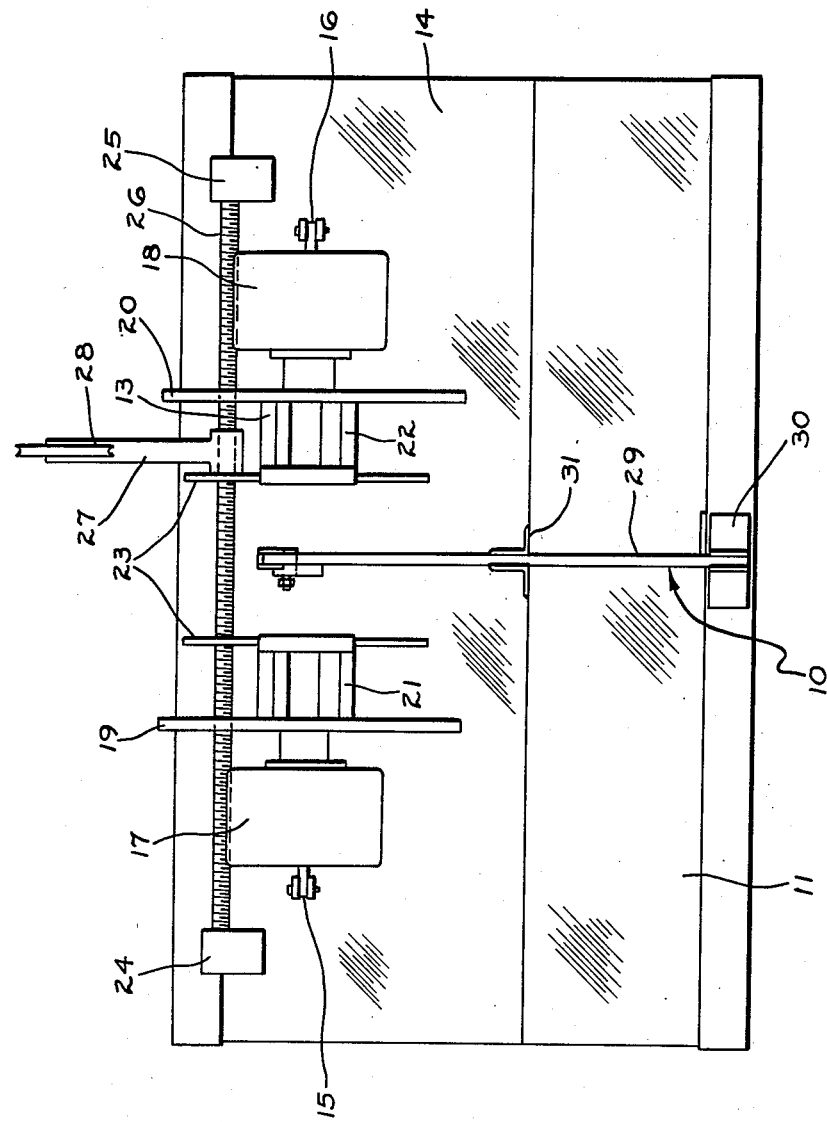

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof in which Figure 1 is a side elevational view of the invention in use with a coiler with portions broken away for clarity of presentation, Figure 2 is a front elevational view showing the invention, Figure 3 is a side view of a portion of the invention, somewhat enlarged over the showing of Figure 1, and Figure 4 is a sectional view of the portion of the invention shown in Figure 3 taken on the line IV—IV thereof.

Like reference characters denote similar parts in the several figures of the drawings.

Referring first to Figure 1, wherein are best shown the general features of the invention, the shear, designated generally by the reference character 10, is shown as mounted on a coiler 11 between two coaxial drums 12 and 13. The drums are mounted on the forward side of a casing 14 and are adapted to be swung outwardly away from the casing by means of hinges 15, 16 having vertical pivot pins. The drums 12 and 13 are provided, respectively, with driving means 17 and 18 and with large circular flanges 19 and 20. Cylindrical bodies 21 and 22 form parts of the drums 17 and 18 and coil-retaining fingers 23 extend radially from the adjacent, inner ends of the bodies. These fingers are hingedly connected to their respective bodies and are capable of being moved on occasion to positions more or less coextensive with the surfaces of the bodies to remove a coil of wire.

Blocks 24 and 25 are located adjacent the sides of the casing 14 of the coiler and between these blocks extends a horizontal driven traverse screw 26. Mounted on the screw and moved from side to side of the coiler by the rotation thereof is a traverse member 27 having a guide wheel 28.

The shear 10 of the invention comprises a main body 29 which is fastened in a vertical position to the central front of the casing 14 of the coiler by means of angles 30 and 31. The main body is preferably formed from steel plate and has a rear edge 32 which engages and closely follows the front surface of the casing 14; an upper edge 33 extends forwardly and slightly upward from the casing. A forward edge 34 of the main body extends upwardly and forwardly from the lower portion of the casing and merges into a curved portion 35, which will be described more fully hereinafter. Somewhat short of the point at which the upper edge 33 and the curved portion 35 would meet if extended, the main body terminates in a short vertical edge. A hardened steel hook 36 is fastened to the main body in this portion.

An electric motor 37 is vertically mounted within the casing 14. It is connected to the input shaft of a gear reduction unit 38. The output shaft 39 of the unit has keyed thereto one end of a crank arm 40. The other end of the arm 40 is pivotally attached to the lower end of a connecting rod 41 for 360° relative rotative movement therebetween. To the upper end of the connecting rod 41 is threadedly fastened a clevis 42. The upper end of the clevis is pivotally connected to one end of a lever 43, the other end of which is pivotally connected and fulcrumed to the main body 29 in a portion thereof adjacent the intersection of the rear edge 32 and the upper edge 33. The intermediate portion of the lever is pivotally attached to the rearward end of an actuating arm 44, the forward end of which is pivotally attached to one end of a blade 45.

Some of the important relationships between the elements of the invention are best shown in Figures 3 and 4. It can be seen that the actuating arm 44 is bent at an angle of about 135° adjacent its connection to the lever 43. At the other end it is provided with a curved, bifurcated end portion 46 which embraces the end of the blade 45 to which it is connected. The more or less central portion of the blade is pivotally connected to the hook 36 by means of a pivot pin 47. The curved portion 35 of the forward edge of main body 29 merges with an inner cutting edge 48 of the hook 36, the curve thus defined being unbroken. The curve is more or less of a spiral, the curvature becoming progressively smaller from its beginning in the lower part of the main body to its end on the extremity of the hook. The cutting edge of the hook is approximately circular, particularly in its intermediate, forward portion. The center of this circle lies approximately on the axis of the cylindrical bodies 12 and 13 of the drums of the coiler. The circle is relatively small, however, being of a diameter somewhat larger than that of the largest size wire that is to be severed. A concave circular cutting edge 49 is provided on the blade 45, this edge being so situated that, when the blade is rotated in a clockwise manner about the pivot pin 47, the edge 49 substantially completes a circle with the circular portion of the edge 48 at one position in its travel.

Figure 4 shows particularly well the manner in which the hook 36 is attached to the main body 29 by means of bolts 50. This view also shows the manner in which the bifurcated end portion 46 of the actuating arm 44 embraces the blade 36. It should be noted, also, in this view that the lever 43 is composed of two identical pieces, between which are sandwiched the portions of the main body 29, the clevis 42, and the actuating arm 44 adjacent their pivotal connections to the lever.

The operation of the invention will now be understood in view of the above description. Finished wire passes over the guide pulley 28 onto the body 22 of the drum 13. By rotating in alternate directions, the screw 26 causes the traverse member 27 to move back and forth over the said body. The drum is rotated by the drive means 18 and the wire is coiled in successive layers on the body. When a sufficient length of wire has been coiled on the drum 13, the screw 26 moves the traverse member 27 quickly to a position overlying the drum 12, where it begins moving back and forth again. Before the traverse member moves between the drums and carries the wire with it, the rotation of the drum 12 is begun and is brought up to normal operating speed. The successive layers of wire soon cover the first strand to be laid in the drum 12, thus locking it in place. The movement of the wire strand which connects the two drums is rather peculiar. The end which is attached to the drum 13 is moved in a circle about the axis of the drums. Drum 13 has continued to rotate at normal operating speed. The strand originates in the outer layer of wire that has been coiled on the drum and passes axially between a pair of fingers 23. At the other end, the strand passes between two fingers of the drum 12 and is buried in the innermost layer of wire on the drum; it is thus spaced a considerable distance from the axis of the drums. Thus, one end of the strand rotates in a circle about the axis of the drums, while the other end moves in a circle which is coaxial with the drums. The theoretical figure thus generated is impossible to describe, even if the wire were perfectly tight. However, the wire is usually somewhat loose and centrifugal force causes a bowing. Now, the drums are rotated in a counter-clockwise manner, as viewed in Figure 2. The strand moves in the manner described above and in a counter-clockwise manner. It eventually strikes the curved portion 35 of the main body 29. The point at which it will strike the curved portion depends, of course, on the phase relationship between the drums. In any case the wire is carried upwardly and inwardly along the curve until it lodges against the circular portion of the cutting edge 48 of the hook 36. Because of the nature of the movement of the strand it will remain so situated indefinitely. However, at a suitable time a control, not shown, will energize the motor 37 which will drive the gear reducing unit 38 and bring about the rotation of the output shaft 39. The control must energize the motor for a length of time sufficiently long to cause at least one complete rotation of the output shaft. The crank shaft 44 will, thus, make at least one complete rotation. The rotation of the crank shaft brings about a reciprocation of the connecting rod 41; this rotates the lever 43 about its pivotal connection with the main body 29. The actuating arm 44 is moved with a generally horizontal reciprocating motion, carrying the end of the blade 45 with it. The motion of the blade is, of course, one of rotation about the pivot pin 47. The end of the blade which carries the circular cutting edge 49 moves from a position well within the outline of the hook 36 to a position wherein the cutting edge forms substantially a complete circle with the circular portion of the cutting edge 48 of the hook and then to a position when the cutting edge 49 has completely passed the cutting edge 48. The blade then moves in the reverse direction and returns to its initial position of rest within the outline of the hook. Since the strand of wire is located within the hook adjacent the circular portion of the cutting edge 48, it is cut by the engagement of the two cutting edges. With the strand severed, the operator can stop the drum 13 and then swing it outwardly from the casing 14 about the hinge 16 into unloading position and, after moving the fingers 23 into their retracted positions coextensive with the surface of the drum, he can remove the coil of wire. He then moves the drum back into its operative position adjacent the front of the coiler casing.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

Having thus described my invention, what I claim as new and desire to secure by Letters Patent is:

1. A shear for wire and the like comprising a hook having a broad flat surface and an inner cutting edge that is approximately semi-circular in part, a blade having a flat surface and a cutting edge that is approximately semi-circular and of the same diameter as the cutting edge of the hook, the hook and the blade being mounted with their flat surfaces in juxtaposition, a spiral-edged body associated with the hook for guiding wire into the hook, and means for bringing about relative movement between the hook and blade to cause their flat surfaces to slide along one another and their cutting edges to pass one another, the spiral having its center generally coincidental with the center of the cutting edge of the hook, the spiral merging at its inner portion with the cutting edge of the hook, the extreme end of the hook extending toward the inner portion of the spiral beyond a line from the center of curvature of the cutting edge to the outer portion of the spiral, so that the wire will have difficulty in leaving the hook after entering the hook.

2. A shear for cutting wire and the like comprising a motor, a reduction unit driven by the motor and having an output shaft, a crank arm keyed at one end to the output shaft, a connecting rod connected at one end to the other end of the crank arm, a lever to which the other end of the connecting rod is attached, a main body to which the lever is pivotally connected, an actuating arm connected at one end to the lever, a flat hook having an inner cutting edge that is approximately semi-circular in part fixedly connected to the main body at a portion thereof substantially spaced from the connection thereto with the lever, means for guiding wire into the hook, a flat blade having at one end a concave cutting edge that is approximately semi-circular and of the same diameter as the cutting edge of the hook pivotally attached to the hook, the other end of the actuating arm being pivotally connected to the end of the blade opposite the cutting edge, the means for guiding the wire consisting of a member formed in a spiral merging at its inner portion with the cutting edge of the hook, the extreme end of the hook extending toward the inner portion of the spiral beyond a line from the center of curvature of the cutting edge to the outer portion of the spiral so that the wire will have difficulty in leaving the hook after entering the hook.

3. A shear as recited in claim 2, wherein the blade is pivotally mounted on the hook for sliding movement on the hook, the pivotal connection between the blade and the hook being so located that at one point in the said movement the two cutting edges form a substantially continuous curve.

References Cited in the file of this patent

UNITED STATES PATENTS

| | | |
|---|---|---|
| 927,359 | Kleinsmith | July 6, 1909 |
| 1,915,827 | Kickler | June 27, 1933 |
| 1,919,710 | Buys | July 25, 1933 |
| 2,424,021 | Cook | July 15, 1947 |
| 2,524,623 | Columber | Oct. 3, 1950 |
| 2,542,384 | Altenpohl | Feb. 20, 1951 |
| 2,676,656 | Nebel | Apr. 27, 1954 |

FOREIGN PATENTS

| | | |
|---|---|---|
| 163,988 | Germany | Nov. 3, 1905 |